United States Patent [19]

Conville et al.

[11] Patent Number: 5,071,582

[45] Date of Patent: Dec. 10, 1991

[54] COOLANT SYSTEM CLEANING SOLUTIONS HAVING SILICATE OR SILICONATE-BASED CORROSION INHIBITORS

[75] Inventors: John J. Conville, Canton; James T. Lyon, Novi; David E. Turcotte, Woodhaven; Stanley T. Hirozawa, Birmingham; Shrikant V. Desai, Grosse Ile; Daniel E. Coker, Woodhaven, all of Mich.

[73] Assignee: BASF Corporation, Parsippany, N.J.

[21] Appl. No.: 563,007

[22] Filed: Aug. 6, 1990

[51] Int. Cl.$^5$ .......................... C02F 5/08; C23F 11/00
[52] U.S. Cl. ........................................ 252/81; 252/80; 252/180; 252/181; 210/696
[58] Field of Search ................... 252/80, 81, 180, 181; 210/696

[56] References Cited

U.S. PATENT DOCUMENTS

| | | | |
|---|---|---|---|
| 3,419,501 | 12/1968 | Levy | 252/135 |
| 3,492,238 | 1/1970 | Wohlberg | 252/87 |
| 4,279,768 | 7/1981 | Busch | 252/80 |
| 4,540,443 | 9/1985 | Baeber | 252/80 |
| 4,711,735 | 12/1987 | Gulley | 252/180 |
| 4,762,638 | 8/1988 | Dollman et al. | 252/135 |

OTHER PUBLICATIONS

Hawley's Condensed Chemical Dictionary 11th Ed. p. 565.

*Primary Examiner*—Prince Willis, Jr.
*Assistant Examiner*—J. Silbermann
*Attorney, Agent, or Firm*—Joyce L. Morrison

[57] ABSTRACT

Cooling system cleaning solutions containing an EDTA salt, a polyhydroxy mono- or dicarboxylic sugar acid, and a soluble nitrate salt are effective in removing scale, corrosion, and solder bloom from cooling systems.

8 Claims, No Drawings

COOLANT SYSTEM CLEANING SOLUTIONS HAVING SILICATE OR SILICONATE-BASED CORROSION INHIBITORS

BACKGROUND OF THE INVENTION

1. Field of the Invention

The subject invention pertains to cooling system cleaning solutions. More particularly, the subject invention pertains to cleaning solutions useful for removing various deposits from cooling systems utilized in the transportation industries.

2. Background of the Invention

Today in the transportation industry, cooling systems used to provide cooling for internal combustion engines contain a number of diverse materials in order to maximize cooling efficiency. At the same time, modern cooling systems minimize weight in order to promote fuel efficiency. Radiators, water pumps, impellers and housings of aluminum have become increasingly common. At the same time, traditional materials, particularly cast iron, steel, brass, and copper continue to be used.

The extreme conditions in which these materials function are ideal for the formation of a variety of corrosion products such as metal oxides, hydroxides, and carbonates, as well as for the deposition of scale, particularly when "hard" water, i.e. water containing appreciable quantities of magnesium, and/or calcium ions is used. Finally, high lead content solders used to join together cooling system components are subject to the development of solder bloom, a high volume corrosion product.

These various deposits when created, coat the surfaces of cooling system components or clog their cooling passages, particularly in radiators. To remove these deposits, cleaning solutions are commonly used. However, these cleaning systems must perform their cleaning function, often in highly alkaline environments, without, at the same time, corroding the metals of which the cooling system is constructed.

U.S. Pat. No. 2,802,733, teaches a cleaning solution containing ethylenediamine tetraacetic acid (EDTA), sodium tripolyphosphate, sodium hydrogensulfite, and mixed oleic acid esters of polyoxyethylene glycols. In U.S. Pat. No. 3,419,501 is disclosed a cleaning solution containing EDTA, a nitrate salt, and an alkali metal silicate. U.S. Pat. No. 3,492,238 discloses a cleaning solution consisting of citric acid, sodium phosphate, sodium hydroxyethyl glycine, and sufficient water to maintain the pH between 6 and 7. In U.S. Pat. No. 4,540,443 is disclosed a cleaning solution effective for removing solder bloom, containing a salt of EDTA, a salt of citric acid, and a soluble salt of nitric acid, optionally containing also an aluminum corrosion inhibitor.

These prior cleaning solutions have had the drawbacks of introducing undesirable contaminants, for example phosphates, into the environment; the ability to remove scale but not solder bloom; or the inability of maintaining hardness ions such as calcium in solution at high pH levels. Many commercial cleaners cause darkening and/or corrosion of aluminum. It would be desirable to prepare a cleaning solution for cooling systems which is effective in removing all common manner of scale and corrosion, in removing solder bloom, in maintaining hardness ions in solution even in highly alkaline environments, and which does not utilize phosphates in its composition.

Objects of the Invention

It has now been surprisingly discovered that cleaning solutions for cooling systems may be prepared which are effective in removing scale, corrosion and oxidation products, and solder bloom without causing blackening or corrosion of the metal surfaces. Moreover, these compositions are effective in maintaining hardness ions such as calcium, aluminum, and iron in solution in the pH 9-14 range.

Description of the Preferred Embodiments

These and other objects have been achieved through the use of cleaning solutions comprising EDTA salts, salts of a polyhydroxy mono- or dicarboxylic sugar acid, sodium or ammonium nitrate, and optionally, nitric acid and/or preferably a corrosion inhibitor. This composition is preferably prepared as a concentrate and then diluted for use.

The EDTA salts suitable for use in the subject invention include the common alkali metal and ammonium salts of EDTA. The sodium salts are preferred, for example the disodium and tetrasodium salts. The tetrasodium salt is preferred.

A soluble nitrate salt, preferably an ammonium or alkali metal salt is used to supply nitrate to the composition. Sodium nitrate is preferred, however other equivalent methods of supplying nitrate ions may also be used. For example, the pH of the total composition may be adjusted by addition of nitric acid which also has the advantage of supplying nitrate ions. The reaction of nitric acid and basic salts contained in the composition will result in liberation of free carboxylic acid and formation of nitrate salts.

The polyhydroxy mono- and/or dicarboxylic acids useful in the compositions of the subject are commonly known as sugar acids, and correspond to the formulae:

$$HOOC-[CH(OH)]_n-X$$

wherein X is $CH_2-OH$ or $COOH$, and wherein n is an integer from 2 to 4. Examples include glyconic and glycaric acids, muconic and mucaric acid, and saccharic acid. Preferred is gluconic acid. The polyhydroxy mono- and/or dicarboxylic acids are preferably used in the form of their salts, particularly their alkali metal salts, and most particularly the sodium salts. However the free acids may also be useful.

Preferred cleaning solutions within the scope of the subject invention also include a corrosion inhibitor, particularly an inhibitor which prevents corrosion of aluminum. Such corrosion inhibitors are well known to those skilled in the art, for example alkali metal silicates, siliconates, and silicone-silicate mixtures are useful corrosion inhibitors for aluminum. Especially preferred is a stabilized silicate/silicone of the type disclosed by U.S. Pat. Nos. 4,370,255, 4,362,644, and 4,354,002 which are herein incorporated by reference. For corrosion protection on copper and brass, numerous derivatives are known commonly to those skilled in the art. Preferred are benzotriazole and tolyltriazole. Most preferred is tolytriazole as the sodium salt.

Also useful in the compositions of the subject invention is a mineral acid. The mineral acid may be used to obtain a favorable pH range, preferably from 7 to 14, more preferably from 9 to 11, or most preferably about 10.3. The mineral acid may be useful in supplying nitrate to the composition when the mineral acid is nitric acid, but primarily is useful in preventing blackening and dissolution of aluminum through pH adjustment, for which the pH 9-11 range is preferred.

The cleaning solution concentrates of the subject invention preferably contain, based on the weight of the concentrate, from 1.0 to about 30.0 percent, preferably from 1.0 to about 10.0 percent, and most preferably about 5.0 percent EDTA salt calculated on the basis of the tetrasodium salt; from 1.0 to about 50 percent, preferably from 1.5 to about 30 percent, and most preferably about 20 percent polyhydroxy mono- and/or dicarboxylic acid calculated on the basis of the sodium salt of gluconic acid; and from 0.5 to about 8.0 percent, preferably from 1.0 to about 5.0 percent, and most preferably about 3.0 percent soluble nitrate salt calculated on the basis of sodium nitrate; the balance of the concentrate water or mixtures of water and a low molecular weight alcohol or glycol, for example methanol, ethanol, propanol, isopropanol, ethylene glycol, propylene glycol, diethylene glycol, and dipropylene glycol, and mixtures thereof. In the remainder of the specification and in the claims, this balance of the composition will be termed the "water miscible diluent." Preferably, the water miscible diluent is water or mixtures of water and ethylene glycol.

When the composition contains a mineral acid, the acid is preferably present in an amount, based again on the total solution, of from 0.5 to about 8.0 weight percent calculated on the basis of 35 weight percent nitric acid. Preferably, the composition contains about 4.0 weight percent of 35 weight percent nitric acid.

When the optional aluminum corrosion inhibitor is present, the preferred range is from 0.1 to about 10.0 percent based on sodium silicate pentahydrate. When the preferred stabilized silicone-silicate inhibitor is used, the most preferred amount is about 10.0 percent. The composition may optionally contain other additional corrosion inhibitors, inert ingredients, surfactants of the nonfoaming type, polyoxyethylene glycols, biocides, fungicides, and so forth. Also useful are dyes, particularly the fluorescent dyes such as the alizarine green and uranine yellow dyes.

EXAMPLE 1

A cleaning concentrate was prepared at pH 10.3 from 5.0 parts tetrasodium EDTA, 20.0 parts sodium gluconate, 3.0 parts sodium nitrate, 4.0 parts 35 weight percent nitric acid 10.0 parts of stabilized silicone-silicate corrosion inhibitor and water to make 100.0 parts. It is possible to add water to obtain lower concentrations. The cleaning solution diluted approximately 1:19 with water, was circulated at 20 gallons/minute at 190° F. and tested against new metal coupons of copper, solder, brass, mild steel, cast iron, and aluminum in a modified ASTM D2570 test, and on coupons having various types of scale, corrosion, and solder bloom. Tests on the new metal coupons showed no significant metal loss.

The solution was effective in removing all corrosion and oxidation products on all oxidized and corroded coupons. The solution was particularly efficient in removing solder bloom. Cast iron and steel coupons having moderate to heavy amounts of general and crevice corrosion and a moderate amount of rust, when treated, showed substantial decrease in general corrosion and rust.

We claim:

1. A cooling system cleaning solution, comprising, based on the total weight of the solution:
   a. from 1 to about 30 percent of an EDTA salt;
   b. from about 1 to about 50 percent of a gluconate salt;
   c. from 0.5 to about 8 percent of a soluble nitrate salt;
   d. from 0.1 to about 10 percent of a corrosion inhibitor selected from the group consisting of alkali metal silicates, siliconates and silicone-silicate mixtures;
   the balance being a water miscible diluent, said solution having a pH in the range of 9 to 11.

2. The cooling system cleaning solution of claim 1 further comprising:
   e. from 0.5 to about 8 percent of a mineral acid.

3. The cooling system cleaning solution of claim 1 further comprising:
   e. from 0.5 to about 8 percent of 35 weight percent nitric acid.

4. The cooling system cleaning solution of claim 1, wherein said EDTA salt is tetrasodium EDTA, said sugar acid salt is sodium gluconate, said soluble nitrate salt is sodium nitrate, and said corrosion inhibitor is a stabilized silicone-silicate corrosion inhibitor.

5. A cooling system cleaning solution, comprising, based on the total weight of the solution:
   a. from 1.0 to about 10.0 percent of tetrasodium EDTA salt;
   b. from 1.5 to about 30 percent of sodium gluconate;
   c. from 1.0 to about 5.0 percent of a sodium nitrate;
   d. from 0.1 to about 10.0 percent of a corrosion inhibitor selected from the group consisting of alkali metal silicates, siliconates and silicone-silicate mixtures;
   e. from 0.5 to about 8.0 percent of 35 weight percent nitric acid;
   with the balance of said solution being water or a mixture of water and one or more low molecular weight alcohols or glycols, the pH of said solution being in the range of 9 to 11.

6. A cooling system cleaning solution as claimed in claim 5, comprising:
   a. about 5 percent tetrasodium EDTA;
   b. about 20 percent sodium gluconate;
   c. about 3 percent sodium nitrate;
   d. about 10 percent of stabilized silicone-silicate corrosion inhibitor;
   e. about 4 percent of 35 weight percent nitric acid; with the balance of said solution being water or a mixture of water and ethylene glycol.

7. The cooling system cleaning solution as claimed in claim 6, further comprising one or more selected from the group consisting of inert ingredients, surfactants of the non-foaming type, polyoxyethylene glycol, biocides, fungicides, dyes and corrosion inhibitors selected from the group consisting of benzotriazoles and tolyltriazoles.

8. The cooling system cleaning solution comprising the solution of claim 7 further diluted with water.

* * * * *